United States Patent
Price et al.

(10) Patent No.: US 7,310,740 B2
(45) Date of Patent: Dec. 18, 2007

(54) SYSTEM AND METHOD FOR A CONFIGURABLE PORTABLE INFORMATION HANDLING SYSTEM COVER SWITCH DELAY

(75) Inventors: Erin L. Price, Pflugerville, TX (US); John Billingsley, Groesbeck, TX (US)

(73) Assignee: Dell Products L.P., Round Rock, TX (US)

( * ) Notice: Subject to any disclaimer, the term of this patent is extended or adjusted under 35 U.S.C. 154(b) by 368 days.

(21) Appl. No.: 10/929,219

(22) Filed: Aug. 20, 2004

(65) Prior Publication Data

US 2006/0047980 A1    Mar. 2, 2006

(51) Int. Cl.
G06F 1/26    (2006.01)

(52) U.S. Cl. ............... 713/320; 713/300; 713/324

(58) Field of Classification Search ............ 713/300, 713/320, 324
See application file for complete search history.

(56) References Cited

U.S. PATENT DOCUMENTS

| 5,803,237 | A |  | 9/1998 | Gandre et al. ......... 200/43.01 |
|---|---|---|---|---|
| 5,926,404 | A | * | 7/1999 | Zeller et al. ............ 713/321 |
| 6,104,582 | A | * | 8/2000 | Cannon et al. ............ 361/1 |
| 2003/0045245 | A1 | * | 3/2003 | Hikishima ............... 455/90 |
| 2003/0070104 | A1 | * | 4/2003 | Bruckner et al. ......... 713/320 |
| 2005/0141702 | A1 | * | 6/2005 | Fan et al. .......... 379/433.01 |
| 2005/0144237 | A1 | * | 6/2005 | Heredia et al. .......... 709/206 |
| 2005/0223245 | A1 | * | 10/2005 | Green et al. ............ 713/300 |
| 2005/0266801 | A1 | * | 12/2005 | Mathews ............... 455/66.1 |
| 2006/0007030 | A1 | * | 1/2006 | Elfand et al. ........... 341/144 |

\* cited by examiner

*Primary Examiner*—Thomas Lee
*Assistant Examiner*—Malcolm D Cribbs
(74) *Attorney, Agent, or Firm*—Hamilton & Terrile, LLP; Robert W. Holland

(57) ABSTRACT

Power down to a reduced power state, such as a standby or off state, of an information handling system is delayed by a user-configured time after detection of closing of the cover of the information handling system. In one embodiment, a cover delay module associated with the BIOS of the information handling system delays communication of the detection of the closing of the cover from the BIOS to a power manager of the operating system that commands the reduced power state. In another embodiment, the cover delay module integrates with the operating system power manager.

17 Claims, 4 Drawing Sheets

| | Dell Inc. (www.dell.com) | |
|---|---|---|
| Page 6 of 7 | Dell Latitude E550 Series Setup | BIOS Version: B05 |

| ********* Power Management ********* <br> BATTERY    AC <br><br> Brightness: [ooooooo] [ooooooo] <br><br> Hyperthreading ( TM ):  Enabled <br><br> Cover Closed Delay:  ┌30 Seconds┐ <br><br> Ring/Event Resume:  Disabled <br> WakeUp on Lan:  Disabled <br><br> Auto on Mode:  Disabled <br> Auto on Time:  00:00 | Allows the user to specify if the computer should notify the Operating System immediately if the cover is closed or wait a specified delay before notifying the Operating System. <br><br> This field does not affect wakeup from the Standby state. Wakeup from the Standby state must be enabled in the Operating System. |
|---|---|

| ↑↓Change Fields | ←,→ Change Values | Alt-P Page | Esc Exit |
|---|---|---|---|

*Figure 3*

SYSTEM AND METHOD FOR A CONFIGURABLE PORTABLE INFORMATION HANDLING SYSTEM COVER SWITCH DELAY

BACKGROUND OF THE INVENTION

1. Field of the Invention

The present invention relates in general to the field of information handling system power management, and more particularly to a system and method for a configurable portable information handling system cover switch delay before initiation of a powered down state.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems having portable configurations have become increasingly popular over time. Portable information handling systems provide users with greater flexibility by allowing users to carry the portable information handling systems with them as they work, such as to meetings. Wireless networks have contributed to the popularity of portable information handling systems by allowing users to access network functions on-the-go in a variety of locations, such as e-mail and Internet functions. However, portability is not without limitations. One significant limitation is that portable information handling systems generally rely on internal battery power. Once the battery loses its charge, the portable information handling system becomes unusable absent external power. To preserve battery power, information handling system managers apply a variety of power conserving techniques. For instance, the Advanced Configuration and Power Interface (ACPI) standard sets a number of reduced power states that portable information handling system assume during periods of user inactivity. The standby ACPI power state is assumed by having the information handling system store current settings in permanent memory, such as the hard disc drive, or in temporary memory, such as RAM, and then having the information handling system power down most or all of the power consuming electronic components. When the information handling system is reactivated, such as by inputs from a user, the stored settings are recalled.

One typical situation that results in a transition to the ACPI standby mode is the closing of a portable information handling system cover. When a user closes the cover of a portable information handling system, the system typically assumes that the user does not intend to use the system for a period of time and thus powers down. Although powering down to the standby state saves power, it generally takes a considerable amount of time to recover from the standby state to the active operational state. In some instances, users will partially close a cover without intending to initiate the standby state but will enter the standby state through inadvertent activation of the cover switch that monitors cover position. For instance, a user may wish to partially close the cover of a portable information handling system to connect a peripheral or to maintain privacy of displayed material when another individual approaches or when in a meeting. Users who inadvertently initiate the standby state are often frustrated by the amount of time taken by the system to recover to the operational state. Inadvertent transition to the standby state creates an inconvenience for users under time pressure to perform tasks, such as send e-mail or open a document for viewing or editing.

SUMMARY OF THE INVENTION

Therefore a need has arisen for a system and method which manages information handling system power down to a reduced power state in response to closing of a cover.

In accordance with the present invention, a system and method are provided which substantially reduce the disadvantages and problems associated with previous methods and systems for managing information handling system power down to a reduce power state in response to closing of a cover. Power down to a reduced power state is delayed by a predetermined time, such as a user configurable delay time, after detection of closing of the cover.

More specifically, a portable information handling system has a housing and cover coupled to allow open and closed positions. A cover switch activator engages a cover switch in the closed position to communicate a cover closed signal to the information handling system Basic Input/Output System (BIOS). The BIOS communicates the cover closed signal to a power manager, which initiates transition to a reduced power state, such as the ACPI standby state, in response to the cover closed signal. A cover delay module delays initiation of the transition to the reduced power state by a predetermined delay time after the cover closed switch is detected. In one embodiment, the cover delay module is implemented as a firmware module in the BIOS that delays communication of the cover closed signal to the power manager. In another embodiment, the cover delay module is implemented as an operating system module that delays execution of the power down transition by the power manager. The amount of the delay time is user configurable through a graphical user interface display.

The present invention provides a number of important technical advantages. One example of an important technical advantage is that incidences of inadvertent information handling system power down to a reduced power state are reduced or eliminated. Users are able to close portable information handling system covers for a configurable time before the reduced power state is initiated. Users therefore may pay less attention when partially closing a cover and inadvertently activating the cover closed switch since the user has time to adjust the position of the cover before a standby state is initiated. Thus, user inconvenience and frustration associated with the delay of recovery from a standby state is reduced by avoiding entry into the standby state unless the circumstances meet the settings determined by the user.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 3 depicts one example of a graphical user interface displayed by the BIOS to allow user-configuration of delay time;

DETAILED DESCRIPTION

Transition of an information handling system to a reduced power state in response to a cover closed indication is delay by a user-configurable delay time to help reduce incidences of inadvertent user initiation of power downed states. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
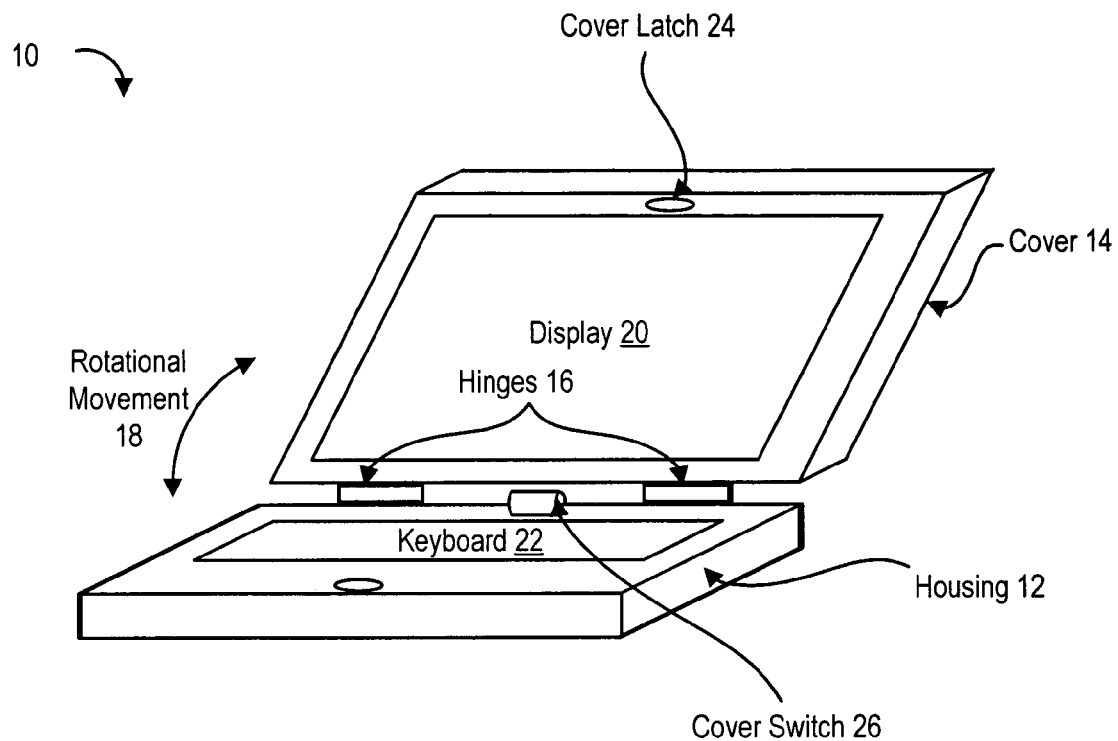
FIG. 1 depicts a portable information handling system configured to detect closing of a cover to a housing.

Referring now to FIG. 1, a portable information handling system 10 is depicted configured to detect closing of a cover. Portable information handling system 10 has a housing 12 and cover 14 rotationally coupled by hinges 16. Cover 14 rotates relative to housing 12 between open and closed positions as depicted by rotational movement arrow 18. In the open position, display 20 and keyboard 22 are exposed to allow the user to interact with portable information system 10 by viewing and inputting information. In the closed position, a cover latch 24 engages housing 12 to hold the display surface of cover 14 proximate the keyboard surface of housing 12. The closed position protects hinges 16, display 20 and keyboard 22 from damage, makes portable information handling system 10 more compact and easy to carry, and serves as an indication of non-use. When cover switch 26 detects the cover in the closed position, a power manager typically powers down the information handling system to a reduced power state, such as a standby or off state. For instance, an ACPI-compliant power manager integrated in the WINDOWS operating system commands an ACPI standby state when cover switch 26 detects cover 14 pressing against it in the closed position.

Figure 2:
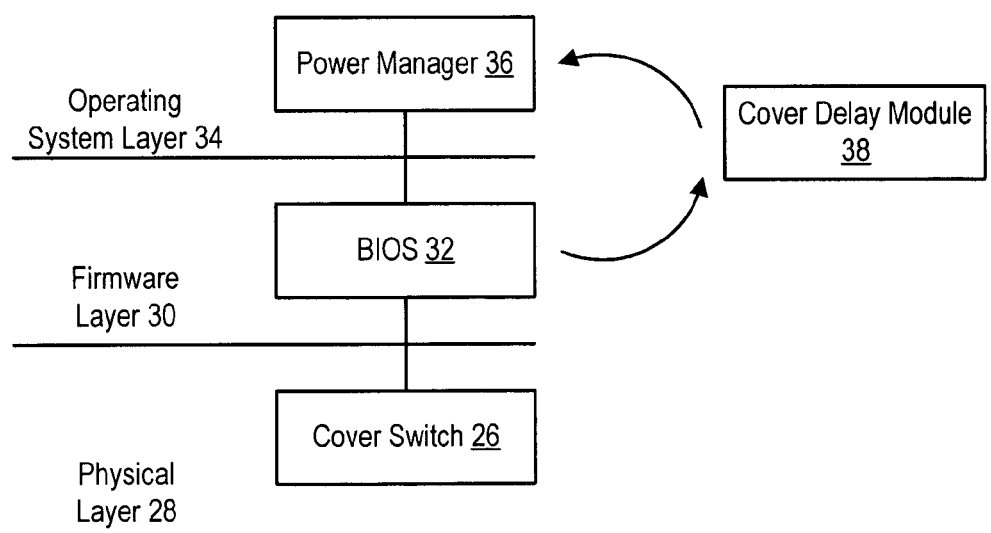
FIG. 2 depicts physical, firmware and operating system layers that coordinate to support a delayed power down in response to detection of a closed cover.
Figure 4:
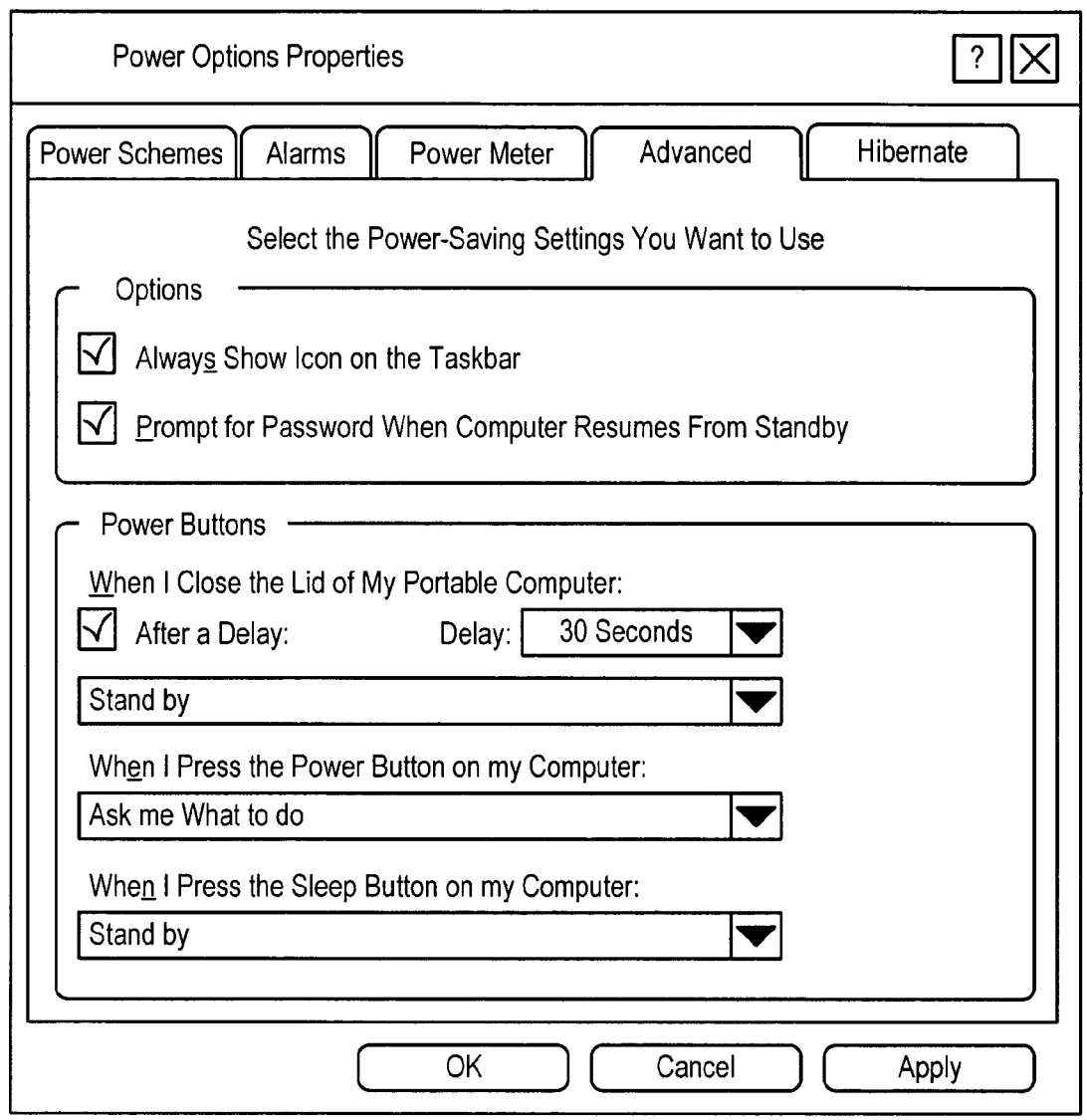
FIG. 4 depicts one example of a graphical user interface displayed by the operating system to allow user-configuration of delay time.

Referring now to FIG. 2, physical, firmware and operating system layers are depicted that coordinate a delay of power down by the power manager in response to detection of a closed cover. At physical layer 28, cover switch 26 detects cover 12 pressing against it and signals closing of the cover to firmware layer 30. A BIOS 32 at firmware layer 30 coordinates interaction of devices at physical layer 28 with operating system layer 34, including communication of the signal from the cover switch 26 to power manager 36 of detection of a closed cover position. If no delay is indicated, power manager 36 powers down information handling system 10 to the ACPI standby state in a conventional manner. If a cover delay module 38 has an associated delay time, then cover delay module 38 delays power manager 36 transition to the reduced power state by the delay time. In one embodiment, cover delay module 38 resides in firmware of BIOS 32 and delays communication of the cover closed signal from BIOS 32 to power manager 36 until after the delay time has passed. FIG. 3 illustrates an exemplary graphical user interface display that allows user configuration of the delay time to a desired time period managed by BIOS 32. In an alternative embodiment, cover delay module 38 is a software module incorporated in operating system layer 34 that delays operation by power manager 36 after the cover closed signal is received until the delay time has passed. FIG. 4 illustrates an exemplary graphical user interface display that allows user configuration of the delay time to a desired time period managed by operating system layer 34.

Figure 5:
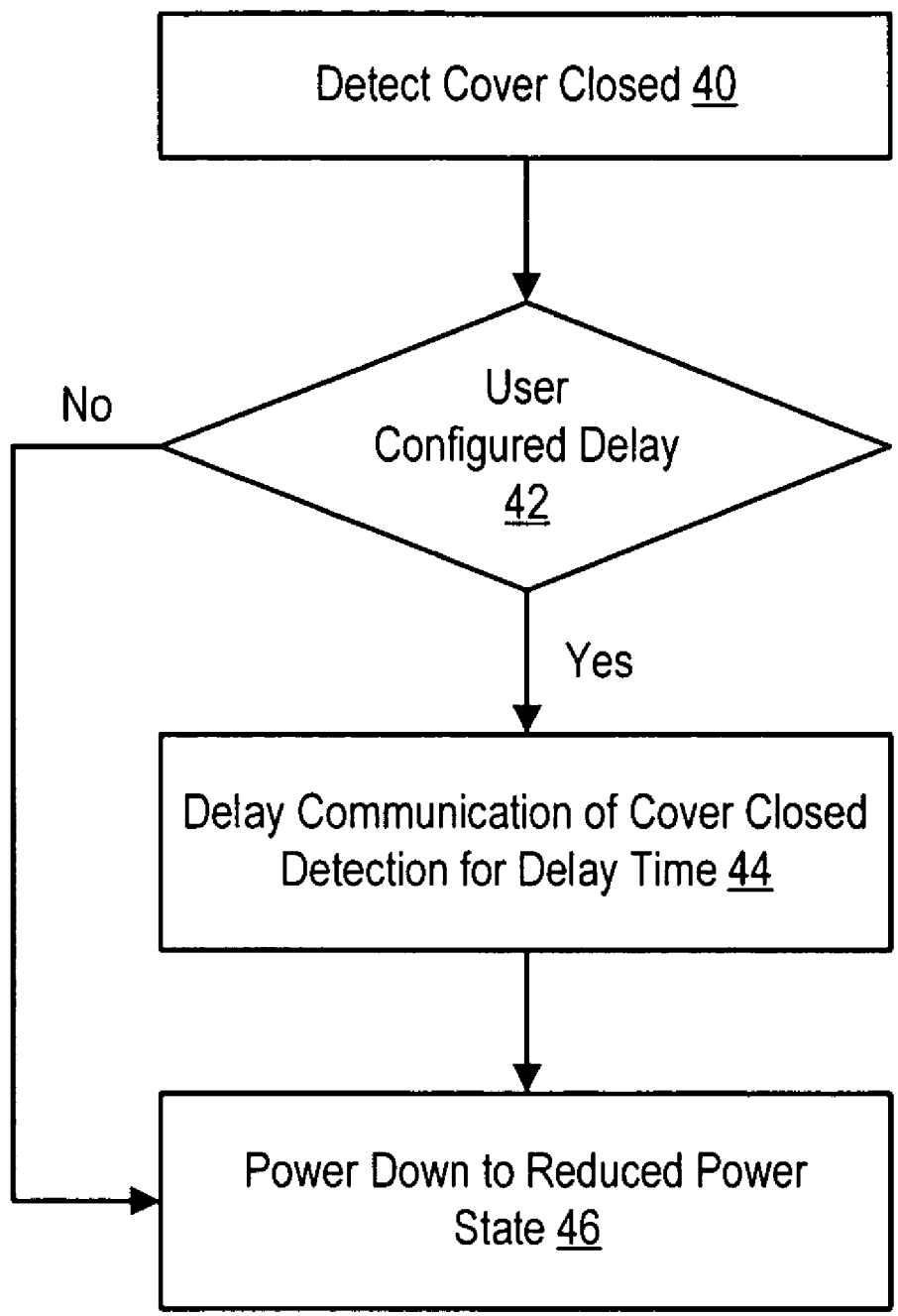
FIG. 5 depicts a flow diagram of a process for managing delayed power down to a reduced power state upon detection of the cover closed position.

Referring now to FIG. 5, a flow diagram depicts a process for managing power states of a portable information handling system in response to the closing of a cover. The process begins at step 40 with detection of closing of the cover of an information handling system. At step 42, a determination is made of whether a user-configured delay is enabled between the closing of the cover and the initiation of the transition to a reduced power state. If a delay time exists, the process continues to step 44 for a delay of communication of the cover closed signal to the power manager that performs the transition of the information handling system to the reduced power state. The delay may be performed at the BIOS by delaying communication of the cover closed signal to the power manager. Alternatively, the delay may be performed at the power manager by delaying execution of the transition to the reduced power state by the power manger until the delay time passes. If, at step 42 no delay is indicated or, at step 44 the delay has passed, the process continues to step 46 for power down to the reduced power state. In alternative embodiments, various other alterations to information handling system operations may be configured by a user through the graphical user interfaces, such as alternative reduced power states that require less time to recover than the ACPI standby state or transitions between multiple states over time after detection of the cover closed signal. In addition, in alternative embodiments, various types of physical switches may be used that mechanically or electronically delay communication of the cover closed signal to the BIOS, such as a mechanical switch that closes a predetermined time period after detection of the cover being closed or an electronic timer that times out before allowing communication of the cover closed signal to the BIOS.

Although the present invention has been described in detail, it should be understood that various changes, substitutions and alterations can be made hereto without departing from the spirit and scope of the invention as defined by the appended claims.

What is claimed is:

1. An information handling system comprising:
a housing;
plural processing components disposed in the housing and operable to process information;
a cover coupled to the housing and operable to between an open position and a closed position;
a display integrated in the system, the display visible to a user in the open position and protected from view in the closed position;
a switch associated with the cover and housing and interfaced with the processing components, the switch operable to detect whether the cover is in the open position or closed position and to communicate the detected cover position to the processing components;
a power manager associated with the processing components and operable to alter the operation of the processing components when the detected cover position changes from the open position to the closed position; and
a cover delay module interfaced with the power manager and operable to delay the power manager from altering the operation of the processing components by predetermined amount of time after the cover position changes from the open position to the closed position;
wherein the processing components comprise a BIOS, the switch interfaces with the BIOS, the BIOS communicates the detected position to the power manager and the power manager comprises an operating system module, and wherein the cover delay module delays the power manager by delaying communication of the detected position to the power manager.

2. The information handling system of claim 1 further comprising a cover delay user interface operable to accept configurable delay time settings.

3. The information handling system of claim 1 wherein the cover delay module comprises a firmware module residing in the BIOS.

4. The information handling system of claim 1 wherein the power manager alters the operation of the processing components by commanding a power down of the processing components.

5. The information handling system of claim 1 wherein the power manager is an ACPI compliant power manager and the power manager alters the operation of the processing components by commanding an ACPI standby state.

6. The information handling system of claim 1 wherein the cover delay module comprises a mechanical switch that delays communication of a cover closed signal for a predetermined time.

7. The information handling system of claim 1 wherein the cover delay module comprises an electronic timer that delays communication of a cover close signal for a predetermined time.

8. A method for managing portable information handling system operational states, the method comprising:
placing the information handling system in an active state having a lid in an open position;
closing the lid;
delaying a change from the active state for a predetermined time; and
initiating a reduced power state in response to the closing of the lid following the passing of the predetermined time;
wherein delaying a change further comprises delaying communication of a power down signal from a switch that detects closing the lid to an operating system that initiates the reduced power state.

9. The method of claim 8 further comprising:
configuring the predetermined time with a graphical user interface display at the information handling system.

10. The method of claim 8 wherein the reduced power state comprises an ACPI standby state.

11. The method of claim 8 wherein delaying communication further comprises delaying communication from an information handling system BIOS of detection of a closed lid to the operating system for the predetermined time.

12. The method of claim 11 wherein delaying is performed by a firmware module associated with the BIOS.

13. The method of claim 8 wherein delaying a change further comprises delaying initiating of a reduced power state at an operating system that initiates the reduced power state.

14. A system for managing portable information handling system operational states, the portable information handling system having a housing and a cover, the cover having open and closed positions, the system comprising:
a switch operable to detect the closed position;
a power manager interfaced with the switch and operable to transition the portable information handling system to a reduced power state if the switch detects transition from the closed position to the open position; and
a cover delay module interfaced with the power manager and operable to delay transition to the reduced power state in response to the transition to the closed position by a predetermined time after transition to the closed positions;
wherein the cover delay module comprises a firmware module interfaced with the switch and operable to delay communication from the switch to the power manager of detection of the closed position.

15. The system of claim 14 further comprising a graphical user interface operable to modify the predetermined time to a user-configurable time.

16. The system of claim 14 wherein the reduced power state comprises a standby state.

17. The system of claim 14 wherein the reduced power state comprises an off state.

* * * * *